United States Patent
Prokhorov

(10) Patent No.: US 7,647,284 B2
(45) Date of Patent: Jan. 12, 2010

(54) FIXED-WEIGHT RECURRENT NEURAL NETWORK CONTROLLER WITH FIXED LONG-TERM AND ADAPTIVE SHORT-TERM MEMORY

(75) Inventor: Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 386 days.

(21) Appl. No.: 11/622,766

(22) Filed: Jan. 12, 2007

(65) Prior Publication Data
US 2008/0172349 A1 Jul. 17, 2008

(51) Int. Cl.
*G06N 3/02* (2006.01)
(52) U.S. Cl. .......................... 706/15; 700/48
(58) Field of Classification Search .......... 706/15; 700/48
See application file for complete search history.

(56) References Cited

U.S. PATENT DOCUMENTS

| | | | |
|---|---|---|---|
| 5,987,444 | A | 11/1999 | Lo |
| 6,272,480 | B1 | 8/2001 | Tresp et al. |
| 6,516,309 | B1 | 2/2003 | Eberhart et al. |
| 6,532,454 | B1* | 3/2003 | Werbos ............ 706/14 |
| 6,665,651 | B2* | 12/2003 | Young et al. ......... 706/21 |
| 6,882,992 | B1 | 4/2005 | Werbos |
| 7,076,350 | B2 | 7/2006 | Alvarez-Troncoso et al. |
| 7,089,217 | B2 | 8/2006 | Kasabov |
| 2004/0015459 | A1 | 1/2004 | Jaeger |
| 2004/0093315 | A1 | 5/2004 | Carney |

OTHER PUBLICATIONS

"Control of a nonlinear multivariable system with adaptive critic designs", N. A. Visnevski, Master Thesis, May 1997, 47 pages.*

(Continued)

*Primary Examiner*—David R Vincent
*Assistant Examiner*—Mai T Tran
(74) *Attorney, Agent, or Firm*—Gifford, Krass, Sprinkle, Anderson & Citkowski, P.C.

(57) ABSTRACT

A controller for a plant having a fixed-weight recurrent neural network with at least one external input signal representative of a desired condition of the plant and actual condition of the plant, and an output connected as a control signal to the plant. The fixed recurrent neural network includes a set of nodes with fixed weight interconnections between the nodes and at least one feedback input interconnecting an output from at least one of the nodes to an input of at least one node. These nodes collectively determine the value of the output from the neural network as a function of the input signal and the feedback input. The controller also includes an adaptive neural network having a plurality of nodes with variable weight interconnections between the nodes. A cost input from the plant is connected to the adaptive neural network while an output from the adaptive neural network is coupled as a processed feedback signal to nodes of the fixed-weight recurrent neural network.

16 Claims, 1 Drawing Sheet

OTHER PUBLICATIONS

"Experimental study of direct adaptive SPSA control system withdiagonal recurrent neural network controller", X. D. Ji, B. O. Familoni, Southeasterncon 96, Bringing Together Education, Science, and Technology, Proceedings of the IEEE, Apr. 11-14, 1996, pp. 525-528.*

"Fixed-Weight Networks Can Learn", Neil. E. Cotter, Peter R. Conwell, Neural Networks, 1990, IJCNN Intl Joint Conf., Jun. 17-21, 1990, pp. III-553-III-559.*

"An Adaptive Recurrent Neural Network System for Multi-Step-Ahead Hourly Prediction of Power System Loads", A. Khotanzad, A. Abaye, D. Maratukulam, Neural Networks, 1994, IEEE World Congress on Computational Intelligence, Jun. 27-Jul. 2, 1994, vol. 5, pp. 3393-3397.*

"Advanced Adaptive Critic Designs", D. V. Prokhorov, D. C. Wunsch II, Proceedings of the 1996 World Congress on Neural Networks, 1996, pp. 83-87.*

"Fixed-weight Controller for Multiple Systems", L. A. Feldkamp, G. V. Puskorius, Neural Networks, 1997, International Conference on Jun. 9-12, 1997, vol. 2, pp. 773-778.*

"Adaptive Behavior with Fixed Weights in RNN: An Overview", D. V. Prokhorov, L. A. Feldkamp, I. Y. Yyukin, Neural Networks, 2002, IJCNN, Proceedings of the 2002 International Joint Conference on 2002, vol. 3, pp. 2018-2022.*

* cited by examiner

FIXED-WEIGHT RECURRENT NEURAL NETWORK CONTROLLER WITH FIXED LONG-TERM AND ADAPTIVE SHORT-TERM MEMORY

BACKGROUND OF THE INVENTION

I. Field of the Invention

The present invention relates generally to controllers utilizing neural networks.

II. Description of Related Art

The neural networks of the type used by a controller to control the operation of a plant, or a system to be controlled in a closed-loop fashion (via feedback), include an input layer, a hidden layer and an output layer. Each of these layers performs a different function.

The input layer receives one or more control signals representative of the desired operation of the plant. The input layer, however, does not process these inputs.

The output layer, conversely, provides one or more output signals to the plant which control the operation of the plant towards a target value. The output layer includes at least one control output coupled to the plant, but optionally may include multiple outputs coupled to the plant.

The hidden layer performs the processing of the signals in order to provide the desired output signals from the output layer in response to the signals from the input layer. The hidden layer includes a plurality of nodes which are interconnected by a set of weights. These weights determine how much relative effect an input value has on the output from each node in the hidden layer. Each node, furthermore, implements some mathematical activation function that is a nonlinear function of the weighted sum of the inputs to that node.

While some neural networks are feed-forward neural networks which provide no feedback within the hidden layer, other neural networks include at least one feedback signal between the nodes in the hidden layer, or between the network outputs and its inputs. Such neural networks with feedback signals are known as recurrent neural networks. This feedback constitutes the short-term memory of the recurrent neural network.

In order to establish the weights between the node interconnections, the previously known neural networks have utilized a training method to set the weights on the node interconnects. Such training methods in these previously known controllers which utilize neural networks necessarily change the weights between the node interconnections during the training period. As such, the original setting for the weights between the node interconnections is lost after the training.

The initial setting of the weights between the nodes typically occurs in off-line training oftentimes using computer simulations. Such offline training enables the controller designer to subject the controller to a wide variety of different operating conditions of the plant. Thus, when properly designed (usually trained), the initial weights of the node interconnections determined through such off-line training result in a robust controller capable of operating well under a wide variety of different operating conditions. Thus, the weights form long-term memory of the controller.

Such off-line training, however, provides a set of weights for the node interconnections that are good on the average for the closed-loop system and which represent the robustness of the controller. However, since all plants differ somewhat from each other, for example, due to environmental variations, it is desirable to provide some adaptivity for the controller in order to optimize the controller operation. Previously, such adaptivity has been accomplished by varying the weights between the node interconnections in an attempt to achieve optimum system performance. Such adjustment of the weights, furthermore, occurs during real-time or on-line training of the controller, i.e. use of the controller with the actual plant that is controlled A primary disadvantage of adjusting the weights of the node interconnection during on-line training, however, is that the value of the weights initially set by the system during off-line training is lost. This is equivalent to corrupting the controller long-term memory. Such variation of the weight of the node interconnection, furthermore, may adversely affect the robustness of the system and result in worsening of the controller performance or, in the extreme case, a complete loss of controller functionality.

SUMMARY OF THE PRESENT INVENTION

The present invention provides a controller using a recurrent neural network which overcomes all of the above-mentioned disadvantages of the previously known controllers.

In brief, the controller of the present invention comprises a fixed-weight recurrent neural network having at least one external input signal connected to the input layer of the neural network and at least one output signal from an output layer of the neural network that is connected as a control signal to the plant. For example, in the case where the plant is an electronic throttle control for an automotive vehicle, the input signal will comprise signals representative of both the target and the actual positions of the throttle valve plate while the output signal from the controller would be connected to actuate the electronic throttle to the target value.

The fixed-weight neural network includes a set of nodes having fixed weight interconnections between the nodes. At least one feedback signal is provided from an output of at least one node and to an input of at least one node. As such, the neural network is a recurrent neural network.

In practice, the weights of the node interconnections of the fixed-weight recurrent neural network are determined in off-line training. Since such training is typically performed by high-fidelity computer simulation, the robustness of the fixed recurrent neural network may be established over a wide variety of different simulated operating conditions.

In order to provide adaptivity of the controller for optimum system performance, the controller of the present invention further includes an adaptive neural system. The adaptive neural system receives an input signal representative of a condition of the plant representative of the difference between a target value and actual value of the plant and an output coupled as a feedback signal connected to at least one node of the fixed recurrent neural network. The adaptive neural system also includes a plurality of nodes representing nonlinear mathematical functions which are interconnected together. Unlike the fixed-weight recurrent neural network, however, the adaptive neural system varies the weights of the node interconnections to achieve optimum performance of the system. Consequently, in operation, the adaptive neural system, during and after on-line training, produces a correction signal to a feedback input of the fixed-weight recurrent neural network to optimize plant performance.

Although the adaptive neural system may take any conventional configuration, in the preferred embodiment of the invention it comprises a recurrent adaptive critic which predicts a cost value over a predetermined horizon in response to a cost signal from the plant. A finite difference algorithm, such as a simultaneous perturbation stochastic approximation, then utilizes the predicted values from the adaptive critic to generate the corrective output signal as a feedback signal to the fixed-weight recurrent neural network.

A primary advantage of the controller of the present invention is that the correction provided by the adaptive recurrent neural network affects only the state, but not the weights, of the fixed-weight recurrent neural network. As such, the robustness of the fixed-weight recurrent neural network obtained through off-line training remains uncorrupted.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
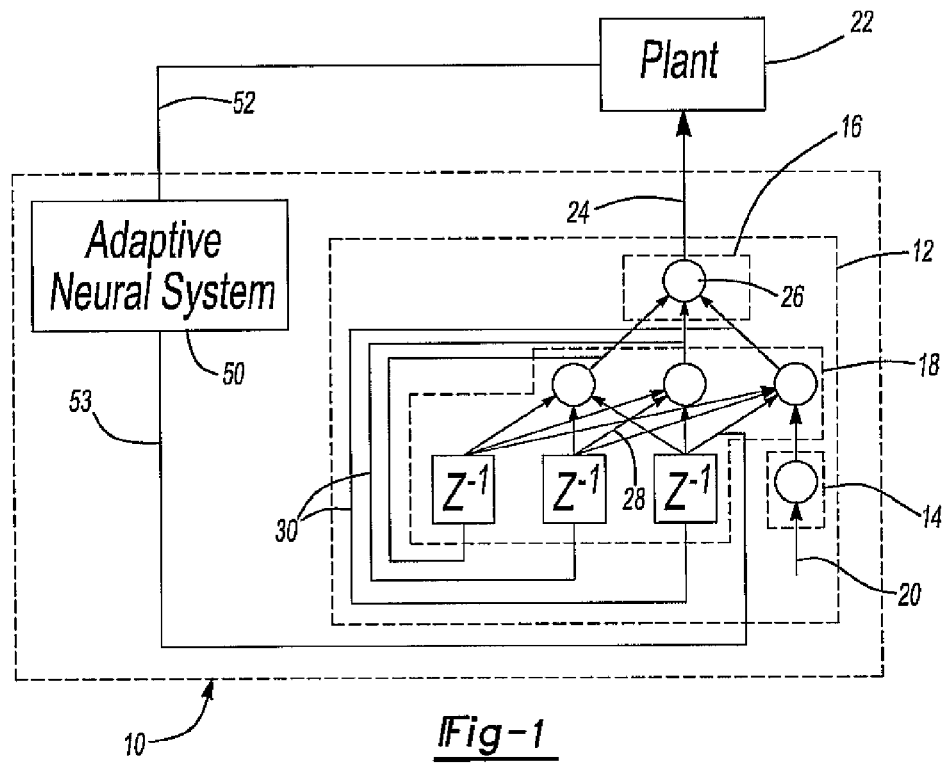
FIG. 1 is a block diagrammatic view illustrating a preferred embodiment of the present invention.

With reference first to FIG. 1, a block diagrammatic view of a preferred embodiment of the controller 10 of the present invention is shown. The controller 10 includes a fixed-weight recurrent neural network (RNN). A typical RNN 12 includes an input layer 14, an output layer 16 and a hidden layer 18. At least one hidden layer is often required, and non-layered neural networks with feedback are also possible.

In the conventional fashion, the input layer 14 receives an input signal on input 20 representative of a desired or target condition of a plant 22. For example, if the plant 22 comprises an electronic throttle of the type used on automotive vehicles, the signal on input 20 may comprise a signal representative of the desired position of the throttle valve plate for the automotive vehicle. Another signal on input 20 includes actual position of the throttle valve plate.

Similarly, the output layer 12 provides a signal on its output 24 as a control signal to the plant 22. Although only one output 24 is illustrated in FIG. 1, it will be understood, of course, that the RNN 12 may have several different outputs 24. In the example where the plant 22 comprises an electronic throttle control, the output signal on output 24 from the RNN 12 will control the degree of actuation of the throttle.

Still referring to FIG. 1, the hidden layer 18 includes a plurality of nodes 26, each of which implements some mathematical activation function that is a nonlinear function of the weighted sum of the inputs to that node. The nodes 26 are interconnected together, as illustrated diagrammatically by the interconnections 28 and each node interconnection within the hidden layer 18 is assigned a predetermined weight.

At least one, and more typically several, feedback interconnections 30 are provided from the outputs of at least one of the nodes 26 and coupled as an input signal $Z^{-1}$ to at least one of the nodes 26 in the hidden layer 18 of the fixed-weight neural network 12.

The weights for the node interconnections 28 are typically obtained through off-line training using computer simulations. Such simulations enable the designer to subject the RNN 12 to a variety of simulated conditions in an effort to obtain satisfactory robustness for the RNN 12. Any conventional method, such as the nprKF (Kalman filter) method, may be used to optimize the weights of the node interconnection in the fixed-weight RNN 12.

Following proper offline training of the RNN 12, the RNN 12 alone will provide acceptable operation of the plant 22. However, since all plants 22, even of the same type, differ somewhat from each other, some adaptivity of the controller is desired for optimal performance of the plant 22. That adaptivity is provided by an adaptive neural system (ANS) 50.

The ANS 50 receives a cost signal on an input 52 from the plant 22. The signal on the input 52 is representative of the difference between a target value and the actual value for that plant condition. Ideally, the cost value on input line 52 is zero, indicative that the actual performance of the plant 22 corresponds to the target value of that condition. In that event, the ANS 50 does not affect the operation of the fixed-weight RNN 12.

Conversely, in the event that the target value for the plant condition differs from its actual value, the cost input to the ANS 50 on line 52 is non-zero. In this event, the adaptive ANS, in a fashion subsequently described in greater detail, generates a correction signal on its output 53 designed to modify the output on line 24 from the fixed-weight RNN 12 in order to adjust the operation of the plant 22 so that the target for the plant condition and the plant condition are equal or near equal to each other.

The output 53 from the ANS 50 is coupled as a feedback input signal to one or more nodes 26 in the fixed-weight RNN. As such, the output signals from the ANS affect the state $Y_{cr}$ of the fixed-weight RNN 12, but do not alter weights of the node interconnections of the RNN 12. Consequently, the adaptive RNN 50 achieves optimization of the operation of the plant 22 through adaptivity provided by the ANS 50 without affecting the robustness of the fixed-weight RNN 12 obtained during off-line training.

Figure 2:
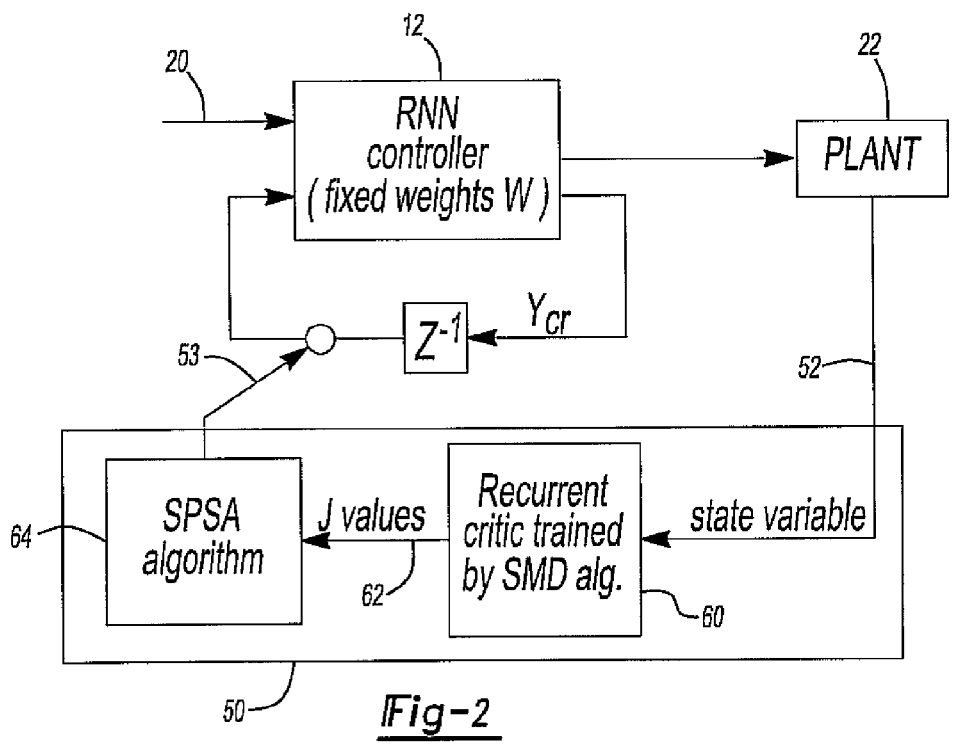
FIG. 2 is a block diagrammatic view illustrating the preferred embodiment of the invention.

With reference now to FIG. 2, although any RNN may be utilized in the block 50 without deviation from the scope of the invention, in a preferred embodiment of the invention, the ANS 50 includes a recurrent adaptive critic 60 which predicts J values on its output 62 as an estimate of the value function with respect to the system state. In essence, the J critic is approximated as follows:

$$J^{target}(t) \sim \sum_{t=1}^{T=\infty} \gamma^{t-1} \cos t(t)$$

Since it is not possible to perform a summation to infinity in practice, a more reasonable horizon is selected by selecting a finite horizon defined by $\gamma$ which reduces the above equation as follows:

$$J(t-1) = \cos t(t-1) + \gamma J(t)$$
$$=> J(t) = \cos t(t) + \gamma J(t+1)$$
where $0 < \gamma < 1.0$
$$T \approx \frac{1}{1-\gamma}$$

The recurrent adaptive critic 60 comprises a neural network having a plurality of interconnected nodes. At least some of these nodes provide feedback signals to other nodes within the network and, optionally, the adaptive neural network receives input signals from the node(s) of the fixed-weight RNN 12 and other state variables of the closed-loop system. However, in order to optimize the operation of the neural network in the adaptive critic 60, it is necessary to subject the adaptive critic 60 to on-line training in order to obtain the proper values for the weights of the various node interconnections in the adaptive critic 60.

Any conventional method may be utilized for on-line training of the adaptive critic 60 as long as it is computationally efficient. However, in a preferred embodiment of the invention, a stochastic meta-descent (SMD) is utilized for such on-line training. The iterative SMD algorithm consists of two steps. First, the vector p of local learning rates is updated $$p(t)=\text{diag}(p(t-1))\max(0.5,1+\mu\text{diag}(v(t))\nabla(t))$$

$$v(t+1)=\eta v(t)+\text{diag}(p(t))(\nabla(t)-\eta Cv(t))$$

where $\eta$ is a forgetting factor, $\mu$ is a scalar meta-learning factor, $v$ is an auxiliary vector, $Cv(t)$ is the product of a curvature matrix C with v, and $\nabla$ is the product of a derivative of J(t) with respect to $W_C$ with the critic error $$J(t)-\text{cost}(t)-\gamma J(t+1)$$

averaged over a short window of time steps. Second, the critic weight update is $$W_C(t+1)=W_C(t)-\text{diag}(p(t))\nabla(t)$$

where $W_C$=weight vector of the critic.

Still referring to FIG. 2, the J output on line 62 from the adaptive critic 60 is processed by a finite difference algorithm 64 to obtain the correction signal $Z_{cr}^{next}$ which is outputted on line 52 (FIG. 1) to the fixed-weight RNN 12. Although any finite difference algorithm may be utilized, an algorithm called simultaneous perturbation stochastic approximation (SPSA) is preferred due to its simplicity and very low computational requirements.

One form of the SPSA uses two cost evaluations that are independent of parameter vector dimensionality to carry out one update of each adaptive parameter. In the present invention, the SPSA algorithm 64 provides node updates on output line 52 rather than weight updates. Specifically, each SPSA update is determined as follows:

$$Y_{i,cr}^{next} = Y_{i,cr} - aG_i(Y_{cr})$$

$$G_i(Y_{cr}) = \frac{J^+ - J^-}{2c\Delta_j}$$

where $Y_{cr}$ is a state vector of the RNN controller, with its updated value $Y_{cr}^{next}$, $\Delta$ is a vector of symmetrically distributed Bernoulli random variables generated anew for every update step (for example, the i-th component of $\Delta$ denoted as $\Delta_i$ is either +1 or −1), $J^\pm$ is a cost function to be minimized where the superscripts "+" and "−" correspond to positive and negative perturbations of $Y_{cr}$, respectively; $Y_{cr}^\pm = Y_{cr} \pm c\Delta$, c is size of a small perturbation step, and a is the learning rate. Consequently, the SPSA algorithm 64 provides updated values of $Y_{cr}$ as follows:

$$Y_{cr}(t-1) \equiv Y_{cr}^{next}$$

Each SPSA update requires that two consecutive values of J from the adaptive critic 60 be computed. Consequently, one SPSA update occurs no more often than once every other time step for the closed-loop system. Thus, in operation, positive and negative perturbations using the SPSA algorithm 64 optimize the value $Y_{cr}^{next}$ necessary to provide the appropriate feedback signal to the fixed-weight RNN 12 to optimize the system performance.

Although other types of adaptive RNN in 50 may be used, the use of the recurrent adaptive critic together with the finite difference algorithm 64 is computationally acceptable and provides adequate system performance. That is particularly true when the SPSA algorithm is utilized as the finite difference algorithm 64. However, different types of adaptive RNN in 50 may alternatively be used without deviation from the spirit or scope of this invention.

From the foregoing, it can be seen that the present invention provides a controller for a plant which utilizes two neural networks 12 and 60 operating in tandem with each other. Since the weights of the node interconnection of the fixed RNN 12 remain constant, the benefits of off-line training of the fixed-weight RNN 12 are retained together with the overall robustness from such off-line training.

Conversely, the adaptive RNN in 50 has node interconnections with variable weights. The weights of the node interconnections for the adaptive RNN are obtained through on-line or real-time training such that the output from the adaptive RNN affects the state, but not the weights, of the fixed RNN 12. The adaptive RNN in 50 is thus able to provide a corrective feedback signal to the fixed-weight RNN 12 sufficient to minimize the difference between the plant target value of a plant condition, and the actual plant value of that condition thus minimizing the cost input to the adaptive RNN.

Having described my invention, however, many modifications thereto will become apparent to those skilled in the art to which it pertains without deviation from the spirit of the invention as defined by the scope of the appended claims.

I claim:

1. Apparatus for controlling a plant comprising:
a fixed-weight recurrent neural network having a processor with memory and at least one external input signal representative of a desired condition of the plant, an output from the recurrent neural network connected as a control signal to the plant, a set of nodes with fixed weight interconnections between said nodes and at least one feedback input interconnecting an output from at least one of said nodes to an input of at least one node, said nodes collectively determining the value of an output of the fixed-weight recurrent neural network as a function of the value(s) of said at least one external input signal and said at least one feedback input,
an adaptive neural system having a cost input corresponding to a difference between a target value for the plant and an actual value for the plant, an output and a plurality of nodes with variable weight interconnections between said nodes, said adaptive neural system output being coupled to at least one feedback input of said fixed-weight recurrent neural network to thereby vary a short-term memory of the fixed-weight recurrent neural network without changing a long-term memory of the fixed-weight recurrent neural network to optimize the cost input.

2. The apparatus as defined in claim 1 wherein said adaptive neural system comprises a recurrent neural network.

3. The apparatus as defined in claim 1 wherein said adaptive neural system comprises an adaptive critic having at least one input connected to said cost input and an output connected to a finite difference algorithm, an output of said finite difference algorithm forming said output from said adaptive neural system.

4. The apparatus as defined in claim 3 wherein said finite difference processor utilizes a simultaneous perturbation stochastic approximation.

5. The apparatus as defined in claim 3 wherein said adaptive critic produces a prediction of the cost parameter for use by the finite difference algorithm.

6. The apparatus as defined in claim 1 wherein said adaptive neural system receives at least one node output signal from said fixed-weight neural network as an input signal.

7. The apparatus as defined in claim 1 and comprising means for adjusting the weights between the adaptive critic nodes in real-time operation.

8. The apparatus as defined in claim 7 wherein said adjusting means comprises means for performing stochastic meta-descent optimization on the node weights.

9. Apparatus for controlling a plant comprising:

a fixed-weight recurrent neural network having a processor with memory, at least one external input signal representative of a desired condition of the plant, an output from The recurrent neural network connected as a control signal to The plant, a set of nodes with fixed weight interconnections between said nodes, said nodes comprising short-term memory and said weights comprising long-term memory, and both said nodes and said weights defining a fixed-weight recurrent neural network, an adaptive neural system having a cost input corresponding to a difference between a target value for the plant and an actual value for the plant, an output and a plurality of nodes with variable weight interconnections between said nodes, said adaptive neural system output being coupled to at least one feedback input of said fixed-weight recurrent neural network to thereby vary the state of said fixed-weight recurrent neural network without changing a long-term memory of the fixed-weight recurrent neural network.

10. The apparatus as defined in claim 9 wherein said adaptive neural system comprises a recurrent neural network.

11. The apparatus as defined in claim 9 wherein said adaptive neural system comprises an adaptive critic having at least one input connected to said cost signal and an output connected to a finite difference algorithm, an output of said finite difference algorithm forming said output from said adaptive neural system.

12. The apparatus as defined in claim 11 wherein said finite difference processor utilizes a simultaneous perturbation stochastic approximation.

13. The apparatus as defined in claim 11 wherein said adaptive critic produces a prediction of the cost parameter for use by the finite difference algorithm.

14. The apparatus as defined in claim 9 wherein said adaptive neural system receives at least one node output signal from said fixed-weight neural network as an input signal.

15. The apparatus as defined in claim 9 and comprising means for adjusting the weights between the nodes in real-time operation.

16. The apparatus as defined in claim 15 wherein said adjusting means comprises means for performing stochastic meta-descent optimization on the node weights.

* * * * *